Feb. 12, 1935. L. HOROWITZ ET AL 1,990,786
AUTOMATIC TRANSMISSION MECHANISM
Filed Dec. 20, 1933 2 Sheets-Sheet 2
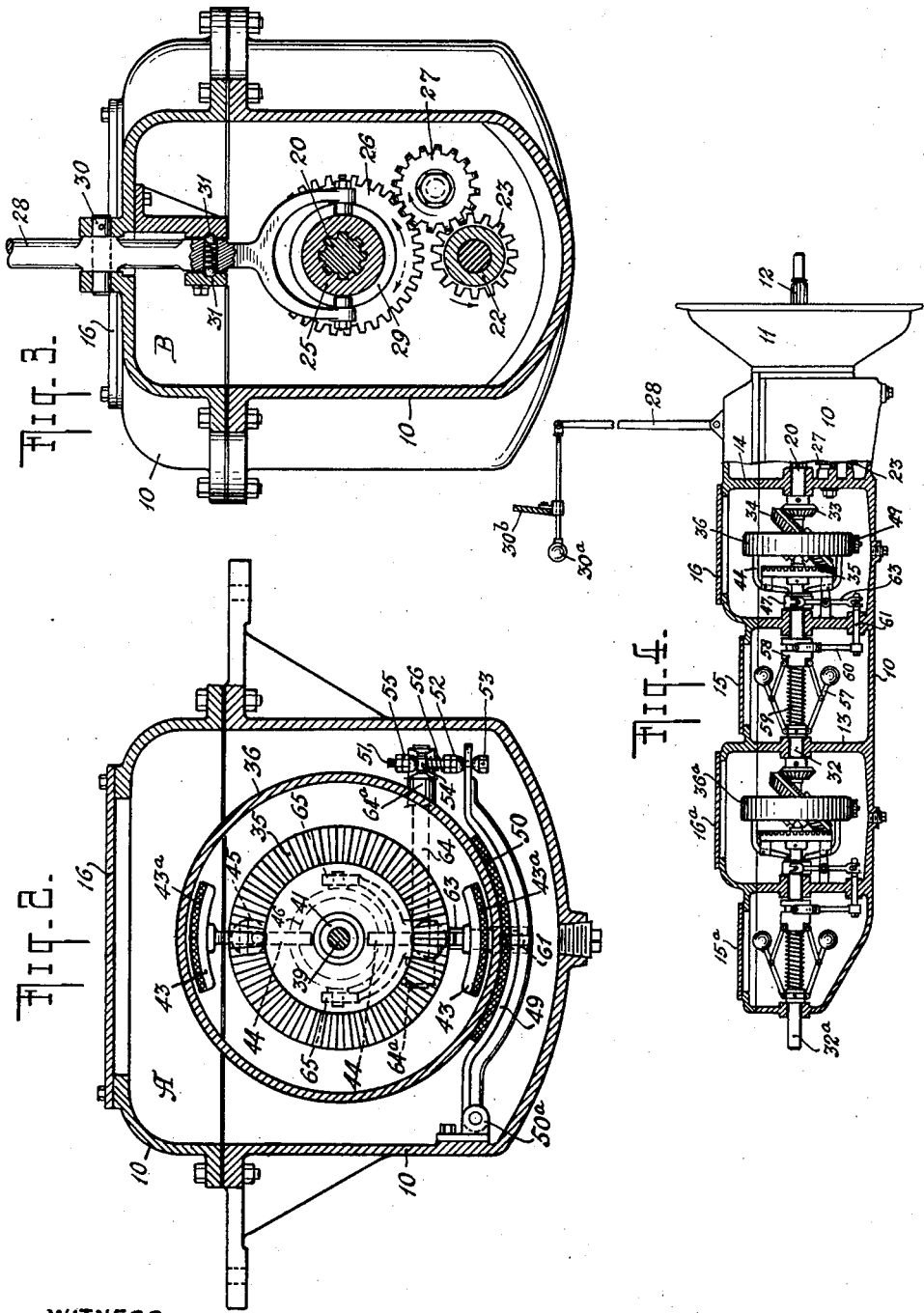
WITNESS
INVENTORS
LOUIS HOROWITZ
JOSEPH BEOLCHI
ATTORNEYS Patented Feb. 12, 1935

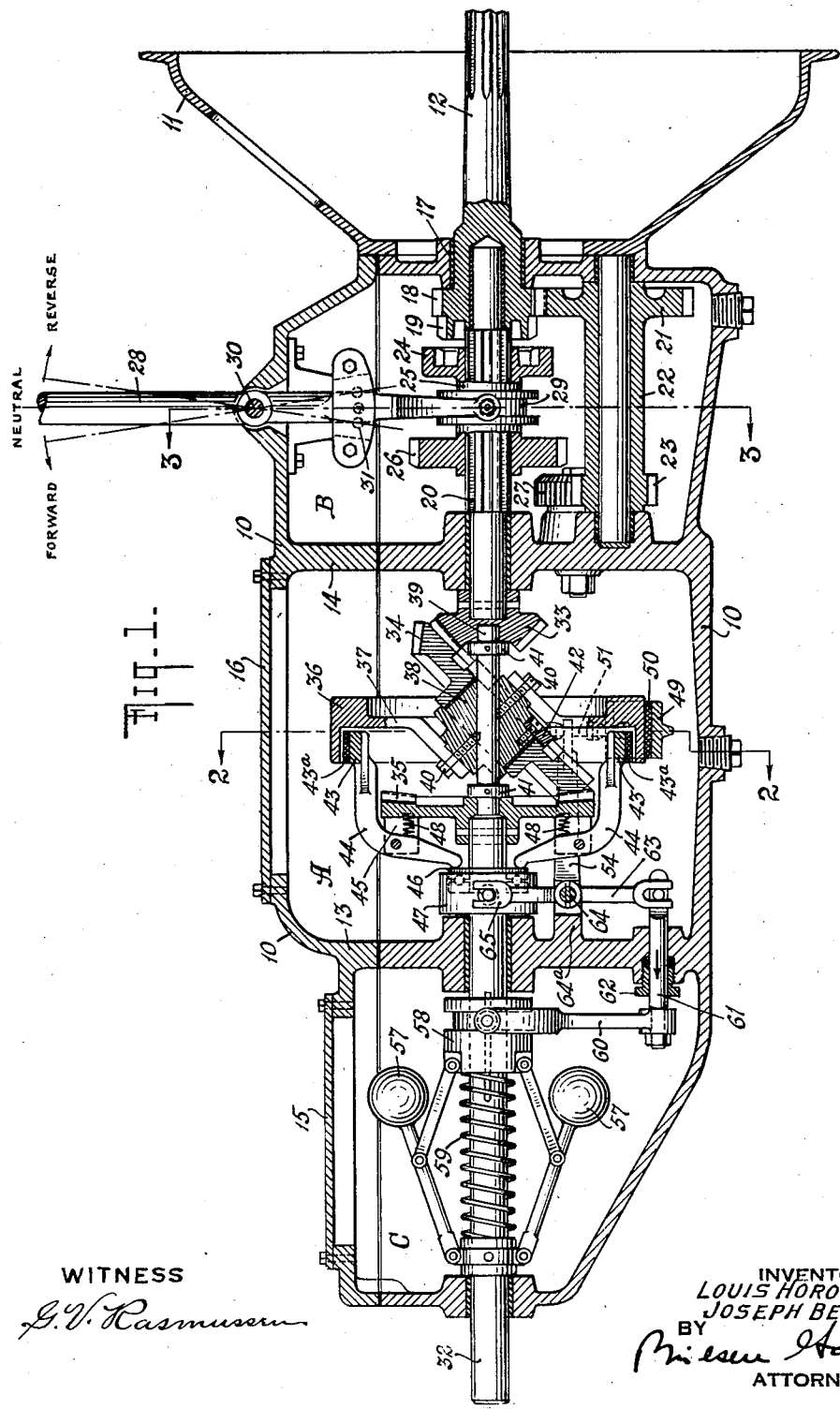

1,990,786

UNITED STATES PATENT OFFICE 1,990,786

AUTOMATIC TRANSMISSION MECHANISM

Louis Horowitz, Brooklyn, and Joseph Beolchi, New York, N. Y.

Application December 20, 1933, Serial No. 703,262

13 Claims. (Cl. 74—336.5)

Our invention relates to change speed or variable power transmission devices, and more particularly to transmissions of this nature which operate automatically to change the speed or transmission ratio between a driving and a driven shaft.

It is an object of the present invention to provide a transmission mechanism, suitable for use in automobiles and other vehicles and also in various stationary engines and machines, which operates to vary automatically the transmission ratio from a driving to a driven shaft continuously from a minimum to a maximum ratio, as contra-distinguished from the change speed arrangements now in general use in which such speed changing is done in stepwise fashion under manual control.

It is a further object of the invention to provide an automatic change speed or variable transmission which is characterized by extreme simplicity and compactness, and is reliable in operation and inexpensive to manufacture.

It is a still further object of the invention to provide an automatic continuously variable transmission in which the parts may be so arranged coaxially upon the same horizontal axis that a structure of low vertical height is obtained. The present invention also provides an improved automatic transmission wherein the arrangement is such that all parts are readily accessible for replacement or repair.

It is also an object of the invention to provide an improved transmission wherein the parts are automatically maintained in gear as the vehicle is brought to a stop, whereby the compression of the engine is caused to assist in braking the vehicle and thereby the demands on the brakes are reduced.

According to the present invention there is provided a transmission mechanism whereby the transmission ratio is continuously increased or decreased automatically in response to corresponding changes in the speed of the driven shaft, so that the vehicle is caused to start or stop with an automatically controlled and uniform acceleration or deceleration.

In the preferred embodiment of the invention there are provided gears upon the driving and driven shafts which are both constantly in mesh with a third gear which operates to transmit the motion of the driving to the driven shaft, such third gear being mounted to rotate about its own axis and thereby act as an idler gear for transmitting the movement from the driving to the driven gear, and being mounted also so as to rotate bodily when locked with reference to the driving and driven gears, in which case it acts as a rigid coupling between the driving and driven shafts. Means are provided in accordance with the invention and operating in response to changes in the speed of the driven shaft to control such third gear in such a manner that it either acts only as an idler gear, in which case the lowest speed transmission ratio is obtained, or it acts as a rigid coupling between the driving and driven gears, in which case the maximum transmission ratio is obtained, or else the third gear is caused to rotate about both its axes to greater or lesser extents, in which case a ratio intermediate the maximum and minimum ratios is obtained. In our preferred construction the three gears are constantly intermeshed, and there is thus obtained a gradual and continuous increase of the gear ratio from the minimum to the maximum as the driven shaft is set into motion or a gradual and continuous decrease of the transmission ratio as the shaft is brought to a stop.

One of the features of the present invention resides in the fact that when it is employed in automobiles the gear shift lever commonly employed in present day automobiles may be dispensed with. To set the change speed transmission for forward or reverse drive there may be provided any suitable type of arrangement, whereby the driving shaft is coupled either directly with the engine shaft for forward drive, or indirectly through suitable gearing for reverse drive. The coupling of the driving shaft with the clutch shaft can be effected with the aid of a lever or rod, whose manually engageable element may be mounted upon the dashboard or instrument panel, or upon any other part of the automobile convenient to the driver.

The automatic transmission according to the invention is constructed of so few parts and is so compact that two or more transmissions may be arranged in tandem within a comparatively limited space when an extremely low transmission ratio is desired for starting or for traveling down hill, as for heavy trucks, busses, etc.

The invention will be further described with the aid of the accompanying drawings in which Fig. 1 shows a central longitudinal section through an arrangement embodying the invention; Fig. 2 is a transverse vertical section on the line 2—2 of Fig. 1 with certain parts omitted for the sake of clearness; Fig. 3 shows a similar section along the line 3—3 of Fig. 1; and Fig. 4 is a central longitudinal section showing an arrangement embodying a plurality of variable automatic transmissions arranged in tandem.

The drawings illustrate the invention as embodied in an automobile, although, as already indicated, it may be employed generally in all types of portable and stationary plants.

Referring to Fig. 1, the numeral 10 designates the transmission housing arranged rearwardly of the clutch housing 11 of the automobile. As the clutch and crank shaft mechanism form no part of the present invention, they have not been illustrated on the drawings, only the clutch shaft 12 being shown. The transmission housing is divided by two partitions or walls 13 and 14 into three compartments, the central one of which houses the automatic transmission mechanism A, the forward compartment the coupling and reverse mechanism B, and the rear compartment the controller mechanism C. The housing may be provided with removable cover plates 15 and 16 in well-known manner to provide access to the interior thereof for replacement or repair.

The clutch shaft 12 extends rearwardly through a bearing 17 and is provided with a gear 18 and a clutch element 19. The rear end of the shaft 12 is enlarged and hollowed out to receive and serve as the forward bearing of an intermediate fluted shaft 20 which is journalled also in the wall 14. The gear 18 is permanently in mesh with a gear 21 on a countershaft 22 which carries also the gear 23. The clutch element 19 is adapted to mesh with an internal clutch element 24 forming part of a sleeve 25 which is keyed to the shaft 20 but is movable axially thereon. A second gear 26 on the sleeve 25 is adapted to mesh with an idler gear 27 which is permanently in mesh with the gear 23. It will be seen that upon movement of the sleeve 25 to the right or left (Fig. 1), the shaft is either directly coupled to the clutch shaft 12 for forward drive, or is coupled thereto through the reduction gearing 18, 21, 23 and 27 for reverse drive.

The sleeve 25 is shifted by means of a forked lever 28 whose furcated end engages in a groove 29 in the sleeve. The lever is pivoted intermediate its ends upon the transmission housing as shown at 30, and its upper end may either extend through the floorboard of the automobile at the right of the driver, or it may be connected, as shown, to a hand operated member 30a extending from the dashboard or instrument panel 30b of the vehicle. It will be understood that, unlike the gear shift levers of the automobiles now in common use, the lever 28 has no lateral movement but is moved only forwardly and rearwardly. Any suitable form of detent or similar device 31 may be provided to hold the lever 28 in forward, neutral, or reverse position.

The variable speed transmission forming the subject-matter of the present invention is designed to transmit the motion of the intermediate driving shaft 20 to the driven shaft 32 connected with the differential of the vehicle (or with the driven member of a stationary plant). The transmission includes a bevel gear 33 fixed to the shaft 20 and meshing with a ring of crown gear teeth on a skew gear 34 which is provided also with a ring of bevel gear teeth meshing with a crown gear 35 fixed to the driven shaft 32. The gears 33, 34, and 35 are constantly in mesh, but the degree of movement transmitted from the gear 33 to the gear 35 by the gear 34 is variable, as will be explained more fully hereinbelow.

The gear 34 is supported upon a drum or ring 36, which may act also as a flywheel. The drum is provided with a pair of arms or spokes 37 between which a block 38 is fixed, the block being clamped to a shaft 39 by set screws 40. The ends of the shaft 39 are journalled within the hub portions of gears 33 and 35, and may be provided with collars 41 engaging such gears to maintain a predetermined spacing therebetween. As can be seen from Fig. 1, the block 38 is arranged with its axis oblique to that of the shaft 39; while the gear 34 is loosely mounted upon the block, a bronze or other bushing being arranged between the gear and block. The gear is held in place on the block between a shoulder on the block and a split retaining ring 42. It will be evident from the foregoing that the gear 34 may move about its own axis on the block 38, about the axis of the shaft 39, or about both axes simultaneously. It will also be clear that when the gear 34 rotates only about its own axis, it acts purely as an idler gear, and the transmission ratio from shaft 20 to shaft 32 will be at a minimum (1:2 in the structure illustrated). On the other hand, when the gear 34 is locked to the gears 33 and 35, as will be described below, and moves only about the axis of shaft 39, the transmission ratio is then at a maximum, namely 1:1. When, however, the gear 34 moves about both axes, the ratio of transmission lies between 1:2 and 1:1. The mechanism for controlling the movement of gear 34 in order to adjust the transmission ratio automatically to the speed of the driven shaft 32 will now be described.

The inner and outer surfaces of the drum 36 are finished so as to serve as brake drum surfaces, the inner one of which is arranged to be engaged by a plurality of expanding brake shoes 43 mounted on arms 44 and provided with replaceable linings 43a. The brake arms are pivotally supported intermediate their ends upon brackets 45 attached to the rear of the gear 35. The opposite ends of the brake arms extend toward the shaft 32 and are arranged to be engaged by a ring 46 loosely mounted upon the shaft 32 and adapted to move axially with a collar 47 slidably positioned on the shaft, the ring forming part of an anti-friction thrust bearing. The brake shoes are normally urged out of engagement with the drum 36 by springs 48.

The outer surface of the drum 36 is adapted to be engaged by one or more brake shoes 49 likewise provided with a renewable lining 50, only one such shoe being illustrated. The shoe is pivotally supported from a bracket 50a attached to the housing 10 (see Fig. 2), and is moved into and out of engagement with the drum 36 by means of an adjustable threaded connecting rod 51 which passes through the free end of the shoe, such rod being threaded to receive nuts 52 and 53 engaging opposite sides of the shoe. The rod penetrates also an arm 54 and receives a nut 55 at its upper end which engages the upper face of the arm. Lock nuts or other devices may be employed to hold the nuts 52, 53 and 55 in their predetermined positions. Between the nut 52 and the arm 54 is arranged a spring 56. Upon downward movement of the rod 51, the shoe falls by its own weight, aided by the spring 56, and releases the drum 36, while the shoe is raised to engage the drum to resist or prevent the movement thereof by rise of the arm 54.

The brake shoes 43 and 49 are arranged so as to move in the same radial direction, so that when one set of shoes moves into engagement with the drum 36 the other set moves out of engagement. When the apparatus is at rest or is being started, the brake shoe or shoes 49 are in engagement with the drum while the shoes 43 are out of engagement therewith.

The function of the brake shoes is to control the movement of the drum 36. Upon only partial engagement of the drum by the brake shoes 43, the brake shoes 49 being released, relative slippage will occur between the drum and the gear 35. This slippage will cause reduced rotation of the drum and hence of gear 34 about the axis of shaft 39, but at the same time will permit the gear 34 to rotate to a limited extent about its own axis, so that the ratio of transmission from the shaft 20 to the shaft 32 will be the resultant of the 1:2 drive between the shaft 20 and shaft 32 effected through the driving of the gear 35 by the gear 33 through gear 34, and the 1:1 drive between the shaft 20 and the shaft 32 due to the fact that the drum 36 moves bodily to a certain extent with the gear 35. The degree of slipping between the brake shoes and the drum 36 thus determines the ratio between the limits of 1:2 and 1:1 at which the shaft 32 is driven by the shaft 20.

The mechanism for varying the degree of engagement of the brake structure with the drum 36 is automatically controlled in any suitable manner in accordance with the speed of a shaft. In the embodiment illustrated in the drawings, such automatic control mechanism comprises a ball governor 57 fixed to the shaft 32 and operating a grooved collar 58 slidably mounted upon the shaft and normally urged toward the right by a spring 59. A forked arm 60 is provided with rollers engaging within the groove of the collar 58, the arm being rigidly connected at its lower end with an axially movable rod 61 passing through a stuffing box 62 in the wall 13 and extending into the compartment containing the variable speed transmission A. The rod 61 is connected by a pin and slot arrangement to a lever 63 rigid with a shaft 64 journalled in brackets 64a extending from the wall 13, the upper end of the lever being two-armed, and the free ends of the arms being forked to receive pins 65 extending from opposite sides of the sleeve 47. The arm 54 which controls the external brake shoe 49 is fixed to the outer end of the shaft 64, as shown in Fig. 2.

It will thus be seen that movement of collar 58 toward the left upon increase in the speed of the shaft 32 will cause movement of the sleeve 47 toward the right. The initial movement will cause partial release of the brake shoes 49 and partial engagement of the brake shoes 43 with the drum, the parts being preferably so dimensioned and arranged that the initial angular movement of the shaft 64 operates to lower the rod 51 to the point where the brake shoes 49 begin to release the drum before the shoes 43 begin to engage the inner surface of the drum. Further movement of the sleeve 47 to the right effects complete release of the drum by the shoe 49 and causes closer engagement of the brake shoes 43, or rather of the linings 43a, with the inner surface of the drum 36 against the resistance of springs 48 until, when a certain speed has been attained by the shaft 32, the drum 36 no longer slips with respect to the brake shoes 43 but is locked thereto and hence to the gear 35 and shaft 32. The gear 34 can then no longer rotate about its own axis but acts to couple the gears 33 and 35 rigidly together.

The operation of our improved mechanism will be clear from the description hereinabove but may be briefly outlined as follows: Assuming that our improved transmission is incorporated in the driving mechanism of an automobile, the engine of the latter is started in the usual manner, the lever 28 being in neutral. The clutch is then thrown out, if it was not out during the starting of the engine, and the lever 28 is moved rearwardly to throw the drive into forward speed. The clutch is then slowly released while the accelerator pedal is gradually depressed, and the transmission mechanism is set into operation.

In the initial condition of the parts, indicated in Fig. 1, the drum 36 is held against rotation by the brake shoes 49, the brake shoes 43 being out of engagement with the drum. The transmission of power consequently takes place initially with the gear 34 acting as an idler gear between the gears 33 and 35, the gear 34 rotating about its axis (which lies obliquely to the common axis of the shafts 20 and 32). At this time the transmission ratio is that determined by the relative sizes of the gears 33 and 35, and is the minimum ratio. As the shaft 32 increases in speed as the accelerator pedal is depressed to a greater and greater extent, the governor 57 causes movement of the sleeve 47 to the right, whereupon the brake shoe 49 is gradually released, permitting greater and greater slippage between the drum 36 and such shoe. The drum is thus now free to rotate at a relatively low rate of speed about the axis of the shaft 39. At approximately the same time the brake shoes 43 are moved in the direction of engagement with the drum 36, a certain degree of slippage taking place between the drum and the shoes 43. The gear 34 will now rotate both about its own axis and also about that of the shaft 39, so that the movement transmitted to the shaft 32 will be the resultant of the partial movement of the gear 34 about its own shaft and of the partial movement of such gear and drum 36 about the axis of shaft 39. During this intermediate period, therefore, the transmission ratio will lie between the minimum and the maximum. As the speed of shaft 32 gradually increases, and finally reaches the lower range of the high speed, the sleeve 47 moves sufficiently to the right to cause the brake shoes 43 to engage the drum more and more tightly, thus reducing the slippage and causing the speed transmission gradually to approach the maximum value, until finally the shoes 43 become locked against the drum, and from then on, there being no longer slippage between the drum and the brake shoes, the shaft 32 rotates at engine speed. At this time the gear 34 no longer revolves about its own axis but acts merely as a lock or rigid coupling between the gears 33 and 35, the elements 33, 34, 35, 36, and 43 from then on moving as a unit, forming a rigid coupling between the shafts 20 and 32.

When the vehicle is to be stopped, the reverse series of events takes place, the brake shoes 43 gradually releasing the drum 36 and the shoe 49 gradually engaging the same until the minimum transmission ratio is attained, whereupon the clutch is thrown out and the foot brakes applied. As the vehicle remains in gear until a very low speed is attained, the strain and wear on the foot brakes are considerably reduced.

It will be noted that, in our improved transmission, when the vehicle is travelling in high speeds, the gears 33, 34 and 35 do not rotate relatively to each other about their axes, so that there is no wear on the teeth, while at the same time the transmission is completely silent. The further advantage may be mentioned that in travelling up a grade, there is no danger of rolling downhill, since the gears are constantly in mesh and changes in the transmission ratio are accomplished automatically.

For putting the transmission in reverse, the lever 28 is moved forwardly, the clutch being out, to bring the gear 26 into mesh with the gear 27.

Fig. 4 shows an arrangement in which a plurality of transmission mechanisms constructed in accordance with the invention are arranged in series in order to obtain a very low minimum ratio, such as 1:4, 1:6, or even lower. The operation of this mechanism will be clear from the description given hereinabove, but it may be pointed out that in this tandem arrangement, the driven shaft 32 acts as the driving shaft for the shaft 32a which is connected with the differential or driven element of the apparatus. The shaft 32 will initially travel at a higher speed than the shaft 32a, and may become locked to the intermediate shaft 20 and hence rotate at engine speed while the shaft 32a is still picking up speed and its drum 36a is still slipping with respect to the brake shoes 43a. If desired, however, the arrangement may be such that the brake shoes 43 and 43a lock the drums 36 and 36a respectively to their shafts 32 and 32a at substantially the same instants.

Variations from the specific constructions and arrangements shown on the drawings may be resorted to without departing from the spirit of the invention. For example, the arm 60 can be replaced by a lever pivoted to a part of the housing above the shaft 32 and engaged intermediate its ends within the groove of the collar 58. The arrangement may also be such that the rod 61 passes through the wall 13 above the shaft 32, in which case a stuffing box may not be required. It will be understood that in the form of the invention illustrated the compartment in which the transmission mechanism A is arranged contains a body of lubricating oil to approximately the height of the shaft 32, while the compartment in which the governor 57 is located is preferably free of oil so as not to interfere with the movement of the governor. It will also be evident that the coupling mechanism B can be replaced by any other suitable means for setting the transmission mechanism for forward or reverse drive. Also, any suitable minimum transmission ratio between the gears 33 and 35 may be selected and the gear 34 may assume any angular position with respect to the gears with which it is in mesh.

We claim:

1. An automatic transmission comprising a driving shaft, a driven shaft coaxial therewith, a gear upon each of said shafts, a drum supported between said gears, a skew gear mounted for rotation upon its own axis within said drum and permanently meshing with said first-mentioned gears, said skew gear in its rotation about its own axis acting as an idler between the two first-mentioned gears, brake shoes mounted upon the driven shaft and arranged to engage said drum gradually to connect the latter with the driven shaft and cause the drum, together with the skew gear to rotate about the axis of the drum, and means responsive to the speed of the driven shaft for bringing said brake shoes gradually into engagement with said drum with temporary slippage to increase the speed of movement of the drum about its axis and finally to lock the drum to the driven shaft when the speed of the latter has reached a predetermined value, whereupon said drum and gears rotate as a unit and act as a rigid coupling between said shafts.

2. An automatic transmission as set forth in claim 1, including a brake shoe mounted externally of the driven shaft and normally holding the drum against rotation, said speed responsive means being arranged to release said brake shoe when the driven shaft has been set into motion.

3. An automatic transmission mechanism comprising a driving shaft, a driven shaft, a gear mounted upon each of said shafts, and an intermediate skew gear permanently in mesh with said first-mentioned gears and mounted to rotate about both its own axis and an axis at an angle thereto, and means acting in response to changes in the speed of the driven shaft to couple said intermediate gear, gradually with temporary slippage, with the driven shaft, as the speed of the latter increases until at a predetermined speed said intermediate gear becomes locked to said driven shaft and all of said gears rotate as a unit.

4. An automatic transmission mechanism comprising a driving shaft, a driven shaft coaxially mounted with said driving shaft, the adjacent ends of said shafts being spaced from each other, a gear mounted upon each of said shafts, a drum loosely mounted on said shafts, a skew gear mounted on said drum for rotation about its own axis and having rings of teeth meshing with said gears at diametrically opposite points with respect to the axis of said shaft so as to effect rotation of the driven shaft in the same direction as the driving shaft, brake mechanism mounted on the driven shaft and arranged to engage the drum, a governor on the driven shaft, means controlled by the governor for causing said brake mechanism to engage said drum gradually as the speed of the driven shaft increases, with temporary slippage until, at a predetermined speed of said driven shaft, said drum becomes locked to said driven shaft and said shafts are thereby rigidly coupled through said gears.

5. An automatic transmission mechanism as set forth in claim 4, including brake mechanism mounted externally of said driven shaft and arranged to hold said drum against rotation, and means actuated by said governor for releasing such brake mechanism when the driven shaft is set into motion.

6. An automatic transmission mechanism comprising a driving shaft, a driven shaft, a gear mounted upon each of said shafts, a device mounted askew with respect to said gears and adapted to mesh with the latter to cause the driving shaft to drive the driven shaft at a speed lower than that of the driving shaft, and means acting in response to increase in the speed of the driven shaft to reduce gradually the relative rotation between said shafts through said device until finally said shafts become rigidly coupled to each other.

7. An automatic transmission mechanism comprising a driving shaft, a driven shaft, a motion transmitting element mounted upon each of said shafts, a device mounted askew with respect to said elements and adapted to engage said elements to cause the driving shaft to drive the driven shaft at a speed lower than that of the driving shaft, and means acting in response to increase in the speed of the driven shaft to reduce gradually the relative rotation between said shafts through said device until finally said shafts become rigidly coupled to each other.

8. An automatic transmission mechanism comprising a driving shaft, a driven shaft, a gear mounted upon each of said shafts, and an intermediate device mounted askew with respect to said gears and adapted to mesh therewith, said device mounted to rotate about both its own axis and an axis at an angle thereto, and means acting in response to increase in the speed of the driven shaft to couple said device gradually with temporary slippage with the driven shaft as the speed of the latter increases until finally said device becomes locked to said gears, and both shafts, together with said device, rotate as a unit.

9. An automatic transmission mechanism comprising a driving shaft, a driven shaft, a gear mounted upon each of said shafts, and a device mounted askew with respect to said gears and provided with teeth permanently in mesh with said first mentioned gears and mounted to rotate about both its own axis and an axis at an angle thereto, and means acting in response to increase in the speed of the driven shaft to couple said device gradually with temporary slippage with the driven shaft as the speed of the latter increases until finally said device becomes locked to said gears, and both shafts, together with said device, rotate as a unit.

10. An automatic transmission mechanism comprising a driving shaft, a driven shaft coaxial therewith, a gear mounted upon each of said shafts, a drum supported between said gears, a device mounted askew with respect to said gears and provided with teeth adapted to mesh therewith, said device mounted for rotation upon its own axis within said drum, and during such rotation acting as an idler between said gears, brake shoes mounted upon the driven shaft and arranged to engage said drum gradually to connect the latter with the driven shaft and cause the drum, together with the skew device, to rotate about the axis of the drum, means responsive to the speed of the driven shaft for bringing said brake shoes gradually into engagement with said drum with temporary slippage to increase the speed of movement of the drum about its axis and finally to lock the drum to the driven shaft when the speed of the latter has increased to a sufficient degree, whereupon the drum and gears together with the skew device rotate as a unit and act as a rigid coupling between said shafts.

11. An automatic transmission mechanism comprising a driving shaft, a driven shaft coaxially mounted with respect to the driving shaft, a gear mounted upon each of said shafts, a drum mounted for independent rotation with respect to said shafts, an intermediate device supported upon said drum askew with respect to said gears and mounted for rotation about its own axis and having rings of teeth meshing with said gears at diametrically opposite points with respect to the axis of the shaft so as to effect rotation of the driven shaft in the same direction as the driving shaft, brake mechanism mounted on the driven shaft and arranged to engage the drum, a governor on the driven shaft, and means controlled by the governor for causing said brake mechanism to engage said drum gradually as the speed of the driven shaft increases with temporary slippage until said drum becomes locked to said driven shaft and said shafts are thereby rigidly coupled to each other through said gears and said skew device.

12. An automatic transmission mechanism as set forth in claim 11 including brake mechanism arranged normally to hold said drum against rotation, and means actuated by said governor for releasing such brake mechanism when the driven shaft is in motion.

13. An automatic transmission mechanism comprising a driving shaft, a driven shaft, a gear mounted upon each of said shafts, a device mounted for rotation about two axes at an angle to each other and adapted to mesh with said gears and to move initially about one axis as the driving shaft is rotated, and means acting in response to increase in the speed of the driven shaft to reduce gradually the rotation of said device about said axis and to cause movement thereof about the other axis with increasing speed until finally said device rotates only about the second axis.

LOUIS HOROWITZ.
JOSEPH BEOLCHI.